Patented Oct. 17, 1950

2,526,490

UNITED STATES PATENT OFFICE 2,526,490

LUBRICANT COMPOSITION

Eugene Lieber, Chicago, Ill., assignor to Standard Oil Development Company, a corporation of Delaware No Drawing. Application December 12, 1946, Serial No. 715,650

8 Claims. (Cl. 252—52)

This invention relates to a novel type of condensation product and to methods of preparing such products and using them for various purposes, more particularly as pour depressors in waxy lubricating oils.

A pour depressor is a substance capable of lowering the temperature at which a hydrocarbon oil comprising a substantially homogeneous mixture of liquid hydrocarbons and waxy solids undergoes loss of fluidity. The expression "pour point" is used herein to mean the pour point as determined by the standard A. S. T. M. method.

Certain heavy-alkyl substituted aromatic hydrocarbon products are known to be pour depressors. It has also been proposed to improve such pour depressors by a subsequent resinification reaction, emphasizing the use of heavy-alkyl substituted aromatics by describing them as being made by condensation of aromatic hydrocarbons with "chlorinated aliphatic hydrocarbons of relatively high molecular weight—especially the paraffin waxes." It should be pointed out that the heavy-alkyl substituted aromatics used as starting materials in that process are in themselves pour depressors for lubricating oils.

On the other hand, it has also been suggested that pour depressors can be prepared by first resinifying an aromatic hydrocarbon and then alkylating the resultant product by condensing it with chlorinated high molecular weight aliphatic hydrocarbon material such as paraffin wax.

It has now been discovered, and is the primary feature of the present invention, that powerful and novel wax modifying agents useful particularly as pour depressors for waxy oils can be prepared which comprise essentially a reaction product of an aromatic compound, a resinifying agent capable of resinifying said aromatic compound, and a condensable aliphatic hydrocarbon compound of low molecular weight preferably having less than 7 carbon atoms. This result is distinctly unexpected and contrary to the above and many other teachings of the prior art.

This application is a continuation-in-part of Ser. No. 469,579, filed December 19, 1942 (now Patent No. 2,412,589), which is a continuation-in-part of Ser. No. 354,144, filed August 24, 1940, now Patent 2,384,107.

The above applications disclose that the purposes of this invention can be accomplished in several different ways, depending essentially upon the order of reacting the several raw materials. According to one method, which for the sake of simplicity will be referred to as method A, the low molecular weight aliphatic hydrocarbon groups are first condensed with an aromatic compound to make an alkylated aromatic compound having at least one alkyl substituent group containing less than 7 carbon atoms, and subsequently resinifying said product by treatment with a suitable resinifying agent, as for instance an aldehyde. On the other hand, according to method B, the aromatic compound is first resinified, as by reaction with an aldehyde, and then the resulting product is alkylated with a low molecular weight aliphatic hydrocarbon group containing less than 7 carbon atoms, as, for instance, by condensation with amyl chloride. It should be understood that no invention is claimed herein as to the first step of either method A or B but only in making the final reaction product. A third method C comprises simultaneous reaction of all three separate constituents, i. e., an aromatic compound, a resinifying agent capable of resinifying said aromatic compound, and a condensable aliphatic hydrocarbon compound of low molecular weight, preferably having less than 7 carbon atoms.

That the invention obtains new and unexpected results is clear from the fact that in method A the alkylated aromatic compound to be resinified does not per se have any substantial pour depressing properties, and only attains such properties as a result of the subsequent resinification. On the other hand, in method B the resinified aromatic compound first formed is likewise not a pour depressor and in some cases is not even soluble in mineral oil, and the desired characteristics of suitable oil-solubility and pour depressing properties are not imparted until the subsequent alkylation. In the earlier applications mentioned above, the claims are limited to the use of hydrocarbons as the type of aromatic raw material. In process B, the reaction of phenol with trioxymethylene gave a resinified product too insoluble to permit alkylation; and the reaction of aniline with trioxymethylene gave a resinified product which, even when alkylated with amyl chloride, did not have pour depressing properties. However, as disclosed and claimed herewith, process A can be successfully applied to hydroxy-aromatic (phenolic) raw materials.

An outstanding advantage of the present invention is that the low molecular weight aliphatic hydrocarbon compounds used in preparing the products of this invention are available in large, substantially limitless, quantity and at relatively low cost; whereas the high molecular weight aliphatic compounds used heretofore are available only in relatively limited quantities and at a cost which at times is relatively high, in view of the great demand for such high molecular weight products in other fields.

The aromatic compounds to be used according to the present invention may comprise only one or mixtures of a number of different types of monomeric mono-, di- and other poly-nuclear aromatic hydroxy compounds thereof capable of being resinified by the resinifying agents to be mentioned further on. Some specific examples of suitable aromatic compounds are phenol, cresol, alpha- and beta-naphthol, petroleum phenols, and the like.

The low molecular weight condensable aliphatic hydrocarbon compounds to be used may be selected from the group consisting of the aliphatic halides, especially the mono-halogen substituted aliphatic hydrocarbons, or olefins corresponding thereto, such as would be obtained by dehydrohalogenation thereof. Specific examples are amyl chloride, hexyl chloride, butyl chloride, isobutyl chloride, and even lower alkyl halides, such as the propyl, especially isopropyl, or other branched alkyl chlorides, although it is preferred to use those having from 4 to 6 carbon atoms.

Although the halogen substituent is preferably chlorine from practical considerations, the other corresponding halides may be used such as bromides and iodides, the fluorides being in most cases somewhat too stable to give the desired reaction. Instead of using any single compound, mixtures of two or more may be used, such as the mixed amyl chlorides available on the market as a commercial product, comprising essentially a mixture of primary, secondary and tertiary amyl chlorides; or other mixed products such as the chlorides obtained by simultaneous chlorination of a mixture of hydrocarbon gases containing 4, 5 and 6 carbon atoms.

The resinifying agents to be used according to the present invention may be those which are already known to the art, including particularly the aldehydes, such as formaldehyde, or products comprising the same, such as tri-oxymethylene, or others such as acetaldehyde, propanaldehyde and the like, or other types of resinifying agents, such as sulfur halides, elementary sulfur, and so forth.

In carrying out the invention according to method A, the alkylated aromatic compound to be used may either be obtained as such from a suitable source or may be manufactured especially for the purposes of this invention, in which case suitable aromatic hydroxy compounds, such as those mentioned above, should be condensed with a suitable low molecular weight aliphatic hydrocarbon compound, such as amyl chloride or amylene, preferably by use of a Friedel-Crafts condensing agent, e. g., aluminum chloride, boron fluoride, zinc chloride, ferric chloride, titanium tetrachloride, boron trichloride, and so forth; or, in some cases anhydrous hydrogen fluoride or mixtures thereof or sulfuric acid or other alkylating agent. The alkylation may be effected by known methods.

The final condensation or resinification of the alkylated hydroxy aromatic compound with the resinifying agent e. g. formaldehyde, is carried out in the presence of an inert solvent or diluent, such as a refined naphtha or kerosene, or a chlorinated hydrocarbon compound, such as tetrachlorethane, dichlorbenzene, or others such as carbon disulfide, nitrobenzene, and so forth; the amount thereof should be about one-half to five times the volume of the reactants. The reaction may, if desired be started at room temperature but the final reaction temperature should be about 125° F. to 300° F., preferably about 150° to 200° F. The time of reaction varies inversely with the temperature used and should be about one-half to five hours, preferably one to two hours, preferably with AlCl₃ catalyst.

After the Friedel-Crafts condensation has been completed, the reaction mixture is cooled, preferably diluted with an inert liquid such as a refined kerosene, and neutralized by pouring into a mixture of alcohol and water. After settling, the kerosene extract is distilled to remove unreacted raw materials and to obtain the desired resinified alkylated aromatic hydroxy compound as a distillation residue.

Although aluminum chloride is the preferred catalyst for the resinification, other condensation catalysts may be used under some circumstances, e. g. zinc chloride, sulfuric acid, phosphoric acid, phosphoric anhydride, acetic acid, etc. The amount of catalyst to be used varies according to the nature and quantities of reactants used and also depends to some extent upon the quality and quantity of product desired, the yield being generally directly proportional to the amount of catalyst used, up to a certain optimum amount, decreasing gradually therefrom. The amount of catalyst should normally be about 10 to 150, preferably about 20 to 100 parts by weight per 100 parts by weight of alkylated aromatic hydroxy compound used. Sometimes products having the most potent pour-depressing effects are produced under conditions giving relatively small yields, but this is not always true.

The final reaction product is recovered by distilling off the low boiling constituents thereof and from solution in a suitable inert solvent such as highly refined kerosene, by distillation under reduced pressure, e. g., with fire and steam, or under vacuum at an absolute pressure as low as 100 mm., preferably as low as 20 mm. mercury, to about 600° F., leaving as a distillation residue the desired reaction products having wax modifying properties.

The reaction product of this invention is usually a more or less brittle resin, ranging from a yellowish to a dark-brown color, although sometimes it has a greenish color, and in a few instances it is more of a viscous oil than a solid. Many of the phenolic-aldehyde condensation resins made heretofore have been either completely insoluble in common solvents, or, if soluble at all in hydrocarbon oils, only soluble in aromatic and naphthenic hydrocarbon oils, and substantially insoluble in highly paraffinic oils. Therefore, it is quite surprising that the phenolic-aldehyde resins of the present invention have good solubility in paraffinic mineral lubricating oils.

The product of this invention has the property of modifying the crystal structure of waxes such as paraffin wax present when added to compositions containing same. For instance, when about .05–10.0%, preferably 0.2–5.0%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes such as for coating or impregnating paper, etc. or for making various molded products.

The proportions in which the various raw materials should be combined to make the novel wax modifying agents of this invention, vary to a substantial extent as indicated in the following experimental example, but in general it may be said that for one mole of aromatic compound, one-half to five moles of low molecular weight aliphatic hydrocarbon compounds should be used and about one-half to two moles of the resinifying agent.

The invention will be better understood from a consideration of the following example, which is given for illustration only.

*Example*

165 grams of tertiary amyl phenol and 32 grams of trioxymethylene were suspended in 200 cc. of o-dichlorbenzene. 20 grams of anhydrous aluminum chloride were then added to the reaction mixture with suitable agitation. After the addition of the AlCl₃, the temperature was increased to 175° F. and maintained thereat for one hour. After cooling, the reaction mixture was diluted with 500 cc. further of kerosene and neutralized by pouring into a mixture of alcohol and water. After settling, the kerosene extract was distilled with fire and steam to 600° F. in order to remove solvent and low-boiling products. A bottoms residue comprising 144 grams of a brown brittle resin was obtained as product.

When this resinification product was added in various amounts to a waxy lubricating oil, the A. S. T. M. pour point of which was 25° F., the resulting blends had the following pour points:

| Per Cent in Test Oil | Pour Point |
|---|---|
| 0.0 | +25 |
| 0.25 | +25 |
| 1.0 | +25 |
| 2.0 | +20 |
| 5.0 | 0 |

Thus according to the present invention, a low molecular weight alkyl aromatic hydroxy compound, such as t-amyl phenol, which per se has no pour-depressing properties, is converted by resinification as with tri-oxymethylene, into a pour depressor having good solubility in waxy lubricating oils.

It is not intended that this invention be limited to any of the specific examples which were given merely for the sake of illustration nor to any theory as to the mechanism of the operation of the invention but only by the appended claims in which it is intended to claim all modifications coming within the scope and spirit of the invention.

It is claimed:

1. A product having good solubility in highly paraffinic mineral lubricating oil, said product consisting essentially of a resin produced by resinification of one mole of an alkyl phenol having 4 to 6 carbon atoms in the alkyl group, with about ½ to 2 moles of a lower saturated aliphatic aldehyde having 1 to 3 carbon atoms, in the presence of ½ to 5 volumes of inert solvent per volume of reactants, and in the presence of about 10 to 150 parts by weight of aluminum chloride catalyst per 100 parts by weight of alkyl phenol, using a final reaction temperature of 125° F. to 300° F., said resin being substantially non-volatile under reduced pressure up to 600° F.

2. The process which comprises resinifying 1 mol of an alkylated hydroxy aromatic hydrocarbon compound not having any substantial pour-depressing properties and containing an alkyl group having from 3 to 6 carbon atoms, with ½ to 2 mols of an aldehyde serving as resinifying agent having 1 to 3 carbon atoms, in the presence of a Friedel-Crafts catalyst, and in the presence of an inert solvent, at a temperature between the approximate temperature of room temperature and 300° F., separating the catalyst from the reaction product and subjecting the said reaction product to distillation under reduced pressure to 600° F. to obtain the desired pour depressor as distillation residue.

3. The process for making pour depressors for waxy lubricating oils which comprises resinifying one mole of an alkyl phenol having 4 to 6 carbon atoms in the alkyl group, with about ½ to 2 moles of a saturated aliphatic aldehyde having 1 to 3 carbon atoms, in the presence of about ½ to 5 volumes of inert solvent per volume of reactants, and in the presence of about 10 to 150 parts by weight of aluminum chloride catalyst per 100 parts by weight of alkyl phenol, using a final reaction temperature of about 125 to 300° F., hydrolyzing and removing the catalyst and subjecting the reaction products to fire and steam distillation up to 600° F. to obtain the desired resinous pour depressor as distillation residue.

4. Process according to claim 6 using an amyl phenol and trioxymethylene.

5. Process according to claim 6 using about one mole of tertiary amyl phenol and about one mole of trioxymethylene, and using a reaction temperature of 175° F.

6. A lubricating oil composition consisting essentially of a major proportion of a waxy mineral lubricating oil having dissolved therein a pour-depressing amount of an oil-soluble brittle resin made by resinification of about one mole of tertiary amyl phenol with about one mole of trioxymethylene in the presence of about ½ to 5 volumes of inert solvent per volume of reactants and in the presence of about 20 to 100 parts by weight of aluminum chloride per 100 parts by weight of tertiary amyl phenol, using a resinification temperature of about 175° F., followed by hydrolysis and removal of the catalyst and distillation of the reaction products with fire and steam up to about 600° F. to obtain the desired pour depressor as distillation residue.

7. An oil-soluble product consisting essentially of a material produced by the resinification of 1 mol of a monomeric hydroxy aromatic hydrocarbon containing an alkyl group having from 3 to 6 carbon atoms in the alkyl group with about ½ to 2 mols of a lower saturated aliphatic aldehyde having 1 to 3 carbon atoms in the presence of about 10 to 150 parts by weight of a Friedel-Crafts catalyst per 100 parts of aromatic compound.

8. A composition consisting essentially of a major proportion of a waxy mineral lubricating oil and a small but pour depressing amount of a material produced by aldehyde resinification of 1 mol of an alkylated hydroxy aromatic hydrocarbon not per se having any substantial pour depressing properties and containing an alkyl group having from 3 to 6 carbon atoms with about ½ to 2 mols of an aldehyde having 1 to 3 carbon atoms in the presence of about 10 to 150 parts by weight of a Friedel-Crafts catalyst per 100 parts by weight of said aromatic compound.

EUGENE LIEBER.

REFERENCES CITED

The following references are of record in the file of this patent:

UNITED STATES PATENTS

| Number | Name | Date |
|---|---|---|
| 1,800,295 | Hönel | Apr. 14, 1931 |
| 2,062,676 | Reiff | Dec. 1, 1936 |
| 2,072,120 | Mikeska et al. | Mar. 2, 1937 |
| 2,173,346 | Turkington et al. | Sept. 19, 1939 |

FOREIGN PATENTS

| Number | Country | Date |
|---|---|---|
| 406,686 | France | Dec. 14, 1909 |
| 375,638 | Great Britain | May 16, 1923 |